United States Patent
Hasegawa et al.

(10) Patent No.: US 6,668,454 B2
(45) Date of Patent: Dec. 30, 2003

(54) METHOD FOR MANUFACTURING A LIQUID-DISCHARGING RECORDING HEAD

(75) Inventors: Toshinori Hasegawa, Yokohama (JP); Masaki Inaba, Kawasaki (JP); Akio Saito, Machida (JP); Akira Goto, Yokohama (JP); Masao Furukawa, Yokohama (JP); Shin Ishimatsu, Yokohama (JP); Miki Itoh, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/207,768

(22) Filed: Dec. 9, 1998

(65) Prior Publication Data

US 2001/0052917 A1 Dec. 20, 2001

(30) Foreign Application Priority Data

Dec. 10, 1997 (JP) .............................................. 9-361819

(51) Int. Cl.[7] ......................... B21D 53/76; B23K 26/00; B41J 2/135
(52) U.S. Cl. ...................... 29/890.1; 29/896.9; 347/44; 347/47; 219/121.61; 219/121.62; 219/121.7; 219/121.71; 219/121.76
(58) Field of Search ................................. 29/890.1, 611, 29/25.35, 852, 896.9; 219/121.61, 121.62, 121.7, 121.71, 121.76; 430/319, 320, 945; 347/44, 47, 65

(56) References Cited

U.S. PATENT DOCUMENTS

| 3,806,829 A | * | 4/1974 | Duston et al. | ......... 219/121.61 |
| 4,313,124 A | | 1/1982 | Hara | |
| 4,330,787 A | * | 5/1982 | Sato et al. | .................... 347/44 |
| 4,345,262 A | | 8/1982 | Shirato et al. | |
| 4,459,600 A | | 7/1984 | Sato et al. | |
| 4,463,359 A | | 7/1984 | Ayata et al. | |
| 4,558,333 A | | 12/1985 | Sugitani et al. | |
| 4,608,577 A | | 8/1986 | Hori | |
| 4,723,129 A | | 2/1988 | Endo et al. | |

(List continued on next page.)

FOREIGN PATENT DOCUMENTS

| JP | 54-56847 | | 5/1979 | |
| JP | 59-123670 | | 7/1984 | |
| JP | 59-138461 | | 8/1984 | |
| JP | 60-71260 | | 4/1985 | |
| JP | 63-303754 | * | 12/1988 | ................... 347/47 |
| JP | 4-216946 | * | 8/1992 | ................... 347/47 |

OTHER PUBLICATIONS

Benker et al., Gneration of Intense Pulsed Electron Beams by the Psudospark Discharge, Plasma Science, IEEE Transactions, pp. 754–757, Oct. 1989.*

Brannon, Excimer–Laser Ablation and Etching, IEEE Circuits and Devices Magazine, pp. 18–24, Sep. 1990.*

Primary Examiner—A. Dexter Tugbang
(74) Attorney, Agent, or Firm—Fitzpatrick, Cella, Harper & Scinto (57) ABSTRACT

A method for manufacturing a liquid-discharging recording head can prevent deviation in the dimensions and the pitch of grooves, serving as liquid channels, and holes, serving as discharging ports, and generation of burrs around discharging ports while maintaining the grooves and the holes to desired sizes and without increasing a time required for the processing when forming the grooves and the holes by projecting a laser beam. When performing ablation processing of the liquid-channel grooves or the discharging ports in a top-plate blank by projecting the laser beam, the processing is performed by changing the energy density per unit time of the laser beam continuously or stepwise by adjusting the oscillation voltage or the oscillation frequency of the laser beam, attenuating the laser beam, or moving a substance to be processed along the optical axis.

16 Claims, 6 Drawing Sheets

U.S. PATENT DOCUMENTS

| | | |
|---|---|---|
| 4,740,796 A | 4/1988 | Endo et al. |
| 5,073,687 A * | 12/1991 | Inagawa et al. ........ 219/121.76 |
| 5,208,604 A | 5/1993 | Watanabe et al. |
| 5,287,622 A * | 2/1994 | Terai ......................... 29/890.1 |
| 5,315,604 A * | 5/1994 | Chiu et al. ............. 219/121.76 |
| 5,361,087 A | 11/1994 | Tajima et al. |
| 5,365,255 A | 11/1994 | Inoue et al. |
| 5,434,383 A * | 7/1995 | Nakata et al. ......... 219/121.61 |
| 5,594,479 A | 1/1997 | Inoue et al. |
| 5,657,539 A | 8/1997 | Orikasa et al. |
| 5,694,684 A | 12/1997 | Yamamoto |
| 5,703,631 A * | 12/1997 | Hayes et al. ................ 29/890.1 |
| 5,748,213 A | 5/1998 | Karita et al. |
| 5,767,479 A * | 6/1998 | Kanaoka ................. 219/121.61 |
| 5,808,641 A | 9/1998 | Miyagawa et al. |
| 5,940,957 A | 8/1999 | Goto et al. |
| 6,211,486 B1 | 4/2001 | Ishimatsu et al. ...... 219/121.71 |

* cited by examiner

METHOD FOR MANUFACTURING A LIQUID-DISCHARGING RECORDING HEAD

BACKGROUND OF THE INVENTION

1. Field of the Invention

The present invention relates to a liquid-discharging recording head in which liquid channels or discharging ports are formed, for example, in a resin top plate according to grooving, drilling or the like by laser irradiation, a method and apparatus for manufacturing the same, a head cartridge, and a liquid-discharging recording apparatus.

2. Description of the Related Art

In general, a liquid-discharging recording head for performing recording or printing on a recording medium (recording paper or the like) by discharging a recording liquid (ink) from fine discharging ports (orifices) in the form of flying droplets includes a substrate (heater board) having a plurality of electrothermal transducers and lead electrodes thereof provided thereon. A resin nozzle layer (liquid-channel forming layer) for forming liquid channels (nozzles) and a common liquid chamber is laminated on the substrate, and a glass top plate having recording-liquid supply tubes provided therein is superposed on the resin nozzle layer. Recently, liquid-discharging recording heads, in which the above-described glass top plate is omitted, a resin top plate is integrally formed according to injection molding or the like by providing recording-liquid supply tubes and the like so as to be integrated with liquid channels and a common liquid chamber, discharging ports are then formed therein, and the top plate is pressed against the substrate by a spring member so as to be integrated therewith, have been developed. In such liquid-discharging recording heads, the number of assembling components is greatly reduced, and the assembling process is greatly simplified. As a result, it is expected that the cost of such a liquid-discharging recording apparatus can be greatly reduced.

Figure 1:
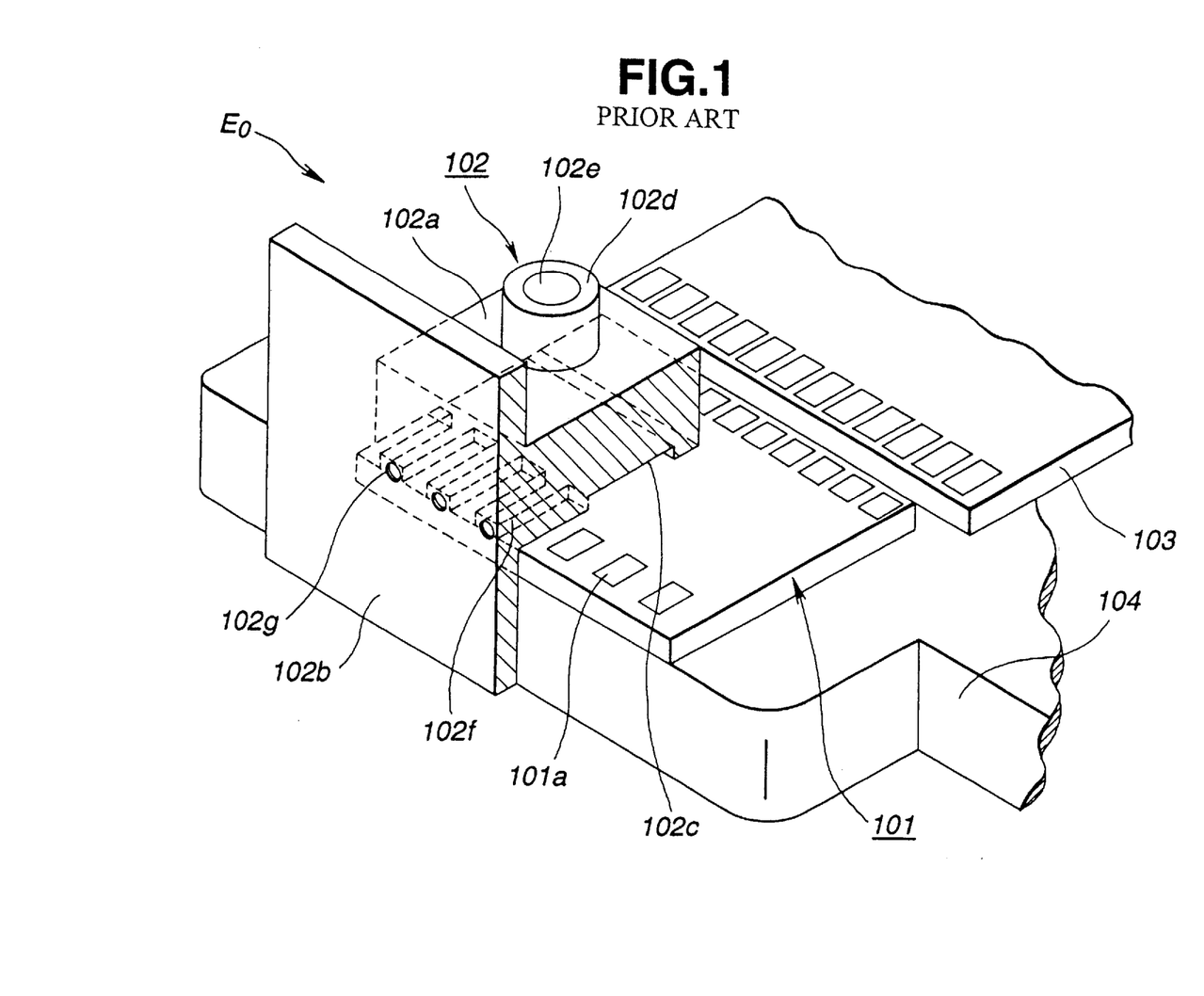
FIG. 1 is a schematic cross-sectional view illustrating the basic configuration of a liquid-discharging recording head in which a part of a resin top plate is broken.

FIG. 1 is a schematic partially-broken perspective view illustrating the basic configuration of a liquid-discharging recording head Eo using a resin top plate which is formed in the above-described manner. In FIG. 1, the liquid-discharging recording head Eo indicated by partially breaking the resin top plate includes a substrate 101 having a plurality of electrothermal transducers 101a, serving as discharging-energy generating elements for generating thermal energy as energy utilized for discharging a liquid, provided thereon, and a resin top plate 102 having liquid channels 102f provided on corresponding ones of the electrothermal transducers 101a, and a common liquid chamber 102c. A discharging-port plate portion 102b having discharging ports (orifices) 102g communicating with corresponding ones of the liquid channels 102f, and a cylindrical projection 102d having a liquid supply port 102e opened to the common liquid chamber 102c are integrally provided.

The resin top plate 102 having the liquid channels 102f, the common liquid chamber 102c, the dicharging-port plate portion 102b and the cylindrical projection 102d is integrally formed according to injection molding, and then, the discharging ports 102g are formed. After positioning the resin top plate 102 so that the liquid channels 102f are positioned above corresponding ones of the electrothermal transducers 101a on the substrate 101, the top plate 102 is pressed against the substrate 101 by an elastic member (not shown) so as to be integrated with the substrate 101. The substrate 101 is fixed on a base plate 104 together with a circuit substrate 103 mounting a driving circuit for generating an electric signal to each of the electrothermal transducers 101a, according to a known method, such as screwing or the like.

A method for manufacturing the resin top plate 102 has also been developed in which after integrally forming a blank (primary molding), comprising a main-body portion 102a before providing the liquid channels 102f, the discharging port plate 102b before providing the discharging ports 102g, and the like, according to injection molding, the liquid channels 102f are formed in the main-body portion 102a of the resin top plate 102 using excimer laser, and the discharging ports 102g are also formed in the discharging-port plate 102b using excimer laser.

Since the resin top plate can be inexpensively manufactured by combining injection molding and laser processing, the cost of the liquid-discharging recording head can be further reduced. An excimer laser apparatus is suitable as a laser processing apparatus for grooving and drilling a blank obtained by injection molding by projecting a laser beam. Such an excimer laser apparatus generally includes a laser oscillator serving as a laser light source, a mask having an aperture pattern for forming liquid channels and discharging ports of a liquid-discharging recording head, and an optical system for projecting the aperture pattern of the mask using a laser beam.

When forming grooves, serving as liquid channels of a liquid-discharging recording head, and forming holes, serving as discharging ports of the head, it is necessary to perform such processing by projecting a laser beam having a high energy density per unit time, in order to obtain grooves and holes having good shapes, obtain large discharging ports, and shorten times required for forming the grooves and holes. In general, as the energy density per unit time of the projected laser beam is larger, the cone angle in processing by the laser beam is smaller, so that accuracy is improved, and grooves and holes having good shapes can be obtained. Particularly when forming holes serving as discharging ports, the cone angle in processing is reduced by projecting a laser beam having a high energy density per unit time, so that large threaded discharging ports can be obtained.

As the energy density per unit time of the projected laser beam is larger, the processing speed by the laser beam is higher. Hence, processing by a laser beam having a high energy density per unit time has many advantages such that grooves and holes can be formed in a short time.

However, when forming grooves, serving as liquid channels, and holes, serving as liquid discharging ports, using a laser beam having a high energy density per unit time as in the above-described conventional technique, if a laser beam having a high energy density per unit time exceeding a threshold is projected onto a resin, the resin tends to be deformed due to instantaneous energy concentration, thereby causing deviation in the dimensions or the pitch of formed grooves and holes, and generation of burrs around threaded discharging ports.

Figure 2:
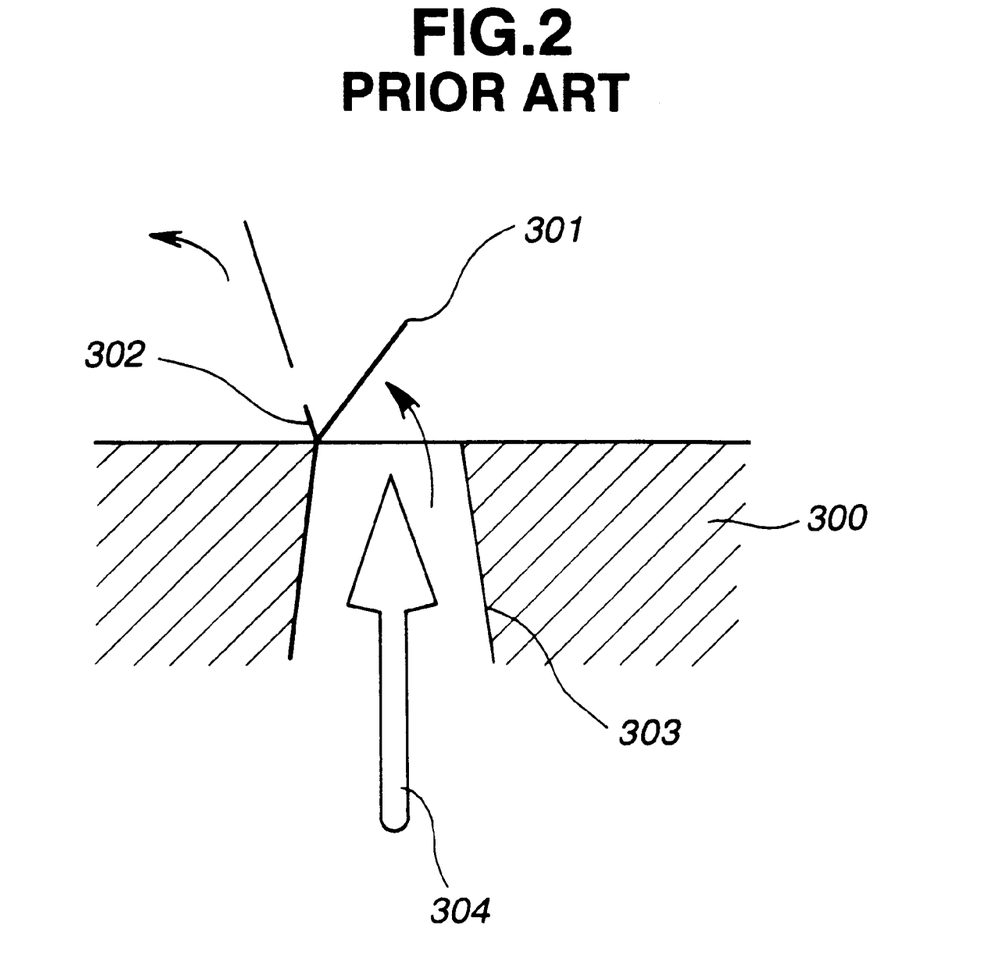
FIG. 2 is a schematic cross-sectional view illustrating a state in conventional laser processing.

FIG. 2 is a schematic cross-sectional view illustrating a result of conventional laser processing.

In FIG. 2, there are shown a material to be processed 300, a through hole 303, and a laser beam 304. As laser ablation processing is performed for the material 300, a sheet-like lid 301 is formed on the surface of the material 300 immediately before the through hole 303 is threaded. By further projecting the laser beam 304 from this state, the lid 301 is further processed to provide a state in which the through hole 303 is threaded. If the processing by the laser beam 304 is performed within the through hole 303 at a constant speed, the lid 301 is projected directly in the direction of the processing. However, if variations are present in the processing speed of the laser beam 304 within the through hole 303, a portion where the processing speed is low operates as a hinge portion 302, and the lid 301 is opened as a door is opened. The hinge portion 302 is torn due to a shock when the lid 302 has been moved, to produce barrs at the torn portion.

When deviation in the dimensions and the pitch of the grooves occurs, misalignment between the grooves and the electrothermal transducers occurs when the top plate is pressed against the substrate (heater board) having the electrothermal transducers in order to be integrated therewith. This misalignment will cause a decrease in the efficiency of conversion from thermal energy to kinetic energy for generating bubbles in the liquid and discharging liquid droplets. If burrs are produced around the threaded discharging ports, discharge of the liquid may be insufficiently performed, for example, by making the direction of discharge of the liquid unstable, or generating unnecessary liquid droplets. If deviation in the pitch of the formed holes occurs, the pitch of the holes deviates from the pitch of the grooves serving as the liquid channels. Hence, it is impossible to obtain discharging ports having a desired size. A liquid-discharging recording head having such problems will have insufficient functions as a product.

If the above-described processing is performed by reducing the energy density per unit time of the projected laser beam, the above-described problems will not occur. However, since the cone angle by the processing increases, it is difficult to produce deep grooves and to obtain large discharging ports, and a long time will be required for the processing, thereby causing, for example, an increase in the cost of the processing required for manufacturing the head.

Accordingly, at present, it is necessary to strictly control and appropriately adjust the energy density per unit time of the projected laser beam in order to prevent occurrence of burrs when the liquid-discharging recording head is manufactured. It is also indispensable to check the shapes of the grooves and the holes, and the presence of burrs around the discharging ports in the process of manufacturing the recording head, thereby causing a great decrease in operational efficiency in the manufacture of the liquid-discharging recording head.

SUMMARY OF THE INVENTION

The present invention has been made in consideration of the above-described problems.

It is an object of the present invention to provide a method and apparatus for manufacturing a liquid-discharging recording head capable of preventing deviation in the dimensions and the pitch of grooves, serving as liquid channels, and holes, serving as discharging ports, and generation of burrs around the discharging ports while maintaining the grooves and the holes to desired sizes and without increasing a time required for the processing when processing the grooves and the holes by projecting a laser beam, and to provide a liquid-discharging recording head having excellent printing characteristics manufactured by such a method, and a head cartridge and a liquid-discharging recording apparatus having such a head.

According to one aspect, the present invention relates to a method for manufacturing a liquid-discharging recording head by projecting a laser beam onto a substance to be processed, and forming holes serving as discharging ports for discharging a liquid. The method includes the step of processing the substance by changing an energy density per unit time of the laser beam projected onto the substance.

According to another aspect, the present invention relates to an apparatus for manufacturing a liquid-discharging recording head. The apparatus includes a light source for generating a laser beam, holding means for holding a substance to be processed in which holes serving as discharging ports for discharging a liquid are formed by the laser beam, and an optical system, including a mask, positioned between the light source and the holding means. The sustance is processed by changing an energy density per unit time of the laser beam projected onto the substance.

In the method for manufacturing a liquid-discharging recording head according to the present invention, a laser beam is used as a light source, a mask is used, the image of the mask is projected onto a primary molding, serving as a substance to be processed, using an optical system, and grooves, serving as liquid channels, and holes, serving as discharging ports, are subjected to ablation processing. The substance is processed by changing the energy density per unit time of the laser beam projected onto the substance.

In the manufacturing method of the present invention, it is desirable that the substance is processed by changing the energy density per unit time of the laser beam projected onto the substance continuously or stepwise.

In the manufacturing method of the present invention, the energy density per unit time of the laser beam projected onto the substance may be changed by adjusting the oscillation voltage or the oscillation frequency of the laser beam, or by simultaneously adjusting the oscillation voltage and the oscillation frequency of the laser beam.

In the manufacturing method of the present invention, it is also possible to change the energy density per unit time of the laser beam projected onto the substance by attenuating the laser beam using a component other than a laser mask, or by moving the substance.

In the manufacturing method of the present invention, when performing ablation processing of the substance by projecting the laser beam thereon, the energy density per unit time of the laser beam projected onto the substance is changed by dividing the laser beam. Thus, deviation in the dimensions and the pitch of the grooves and the holes due to distortion of resin is prevented, and the generation of burrs around the discharging ports threaded by the laser beam is prevented, while maintaining the depth of the grooves and the size of the discharging ports to desired shapes and without increasing processing time.

When performing ablation processing of the substance, by continuously changing the energy density per unit time of the laser beam projected onto the substance, it is possible to continuously change the shape of the processed portion in accordance with the change of the energy density, and prevent a change in the shape of the processed portion which is inevitable as a result of an abrupt change in the energy density per unit time of the laser beam, and prevent deviation in the dimensions and the pitch of the formed grooves and holes. In another approach, by changing the energy density per unit time of the laser beam stepwise, deviation in the dimensions and the pitch of the grooves and the holes due to deformation of resin is prevented. After projecting a few pulses of a laser beam having a low energy density per unit time immediately before completion of the processing after projecting a laser beam having a high energy density per unit time, it is possible to prevent generation of burrs around the discharging ports.

It is possible to change the energy density per unit time of the laser beam projected onto the substancematerial by adjusting the oscillation voltage of the laser beam, adjusting the oscillation frequency of the laser beam, simultaneously adjusting the oscillation voltage and the oscillation frequency of the laser beam, attenuating the laser beam using a component other than the laser mask, or moving the substance.

According to the present invention, when forming liquid channels and discharging ports in a resin top plate or the like by forming grooves and holes by projecting a laser beam, by changing the energy density per unit time of the laser beam continuously or stepwise, a change in the shape of the processed portion which is inevitable as a result of an abrupt change in the energy density is prevented, and deviation in the dimensions and the pitch of the formed grooves and holes, and generation of burrs around the threaded discharging ports are prevented. In addition, it is possible to accurately form grooves, serving as liquid channels, having a desired depth, and discharging ports having a desired size, and to form the liquid channels and the discharging ports in a short time. As a result, it is possible to improve productivity and reduce the production cost.

In a liquid-discharging recording head manufactured by changing the energy density per unit time of a laser beam when forming liquid channels and discharging ports in a resin top plate or the like by forming grooves and holes by projecting the laser beam, deviation in the dimensions and the pitch of the formed grooves and holes, and generation of burrs around the threaded discharging ports are prevented, and it is possible to accurately form grooves, serving as liquid channels, having a desired depth, and discharging ports having a desired size. Since misalignment between the liquid channels and the discharging ports, and electrothermal transducers does not occur, an excellent printing property can be obtained.

The foregoing and other objects, advantages and features of the present invention will become more apparent from the following description of the preferred embodiments taken in conjunction with the accompanying drawings.

BRIEF DESCRIPTION OF THE DRAWINGS

FIGS. 3A–3C are diagrams illustrating a liquid-discharging recording head manufactured by applying a method for manufacturing a liquid-discharging recording head according to a first embodiment of the present invention.

FIGS. 5A–5C are diagrams illustrating a liquid-discharging recording head manufactured by applying a method for manufacturing a liquid-discharging recording head according to a second embodiment of the present invention.

DESCRIPTION OF THE PREFERRED EMBODIMENTS

Preferred embodiments of the present invention will now be described with reference to the drawings.

Figure 3A:
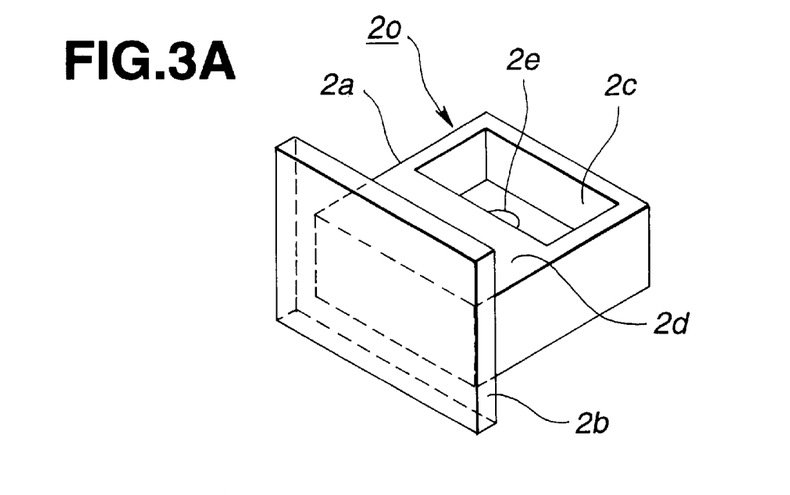
FIG. 3A is a perspective views illustrating a top-plate blank comprising a molded resin in the liquid-discharging recording head.
Figure 3B:
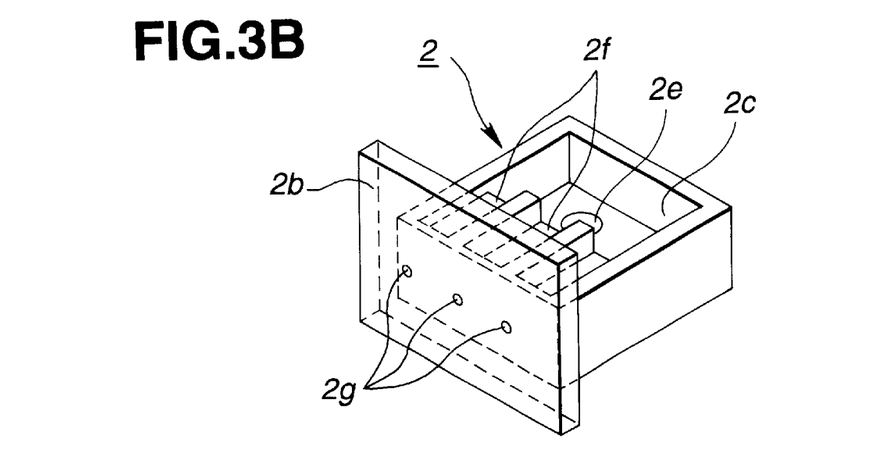
FIG. 3B is a perspective view illustrating a resin top plate in which liquid channels and discharging ports are formed.
Figure 3C:
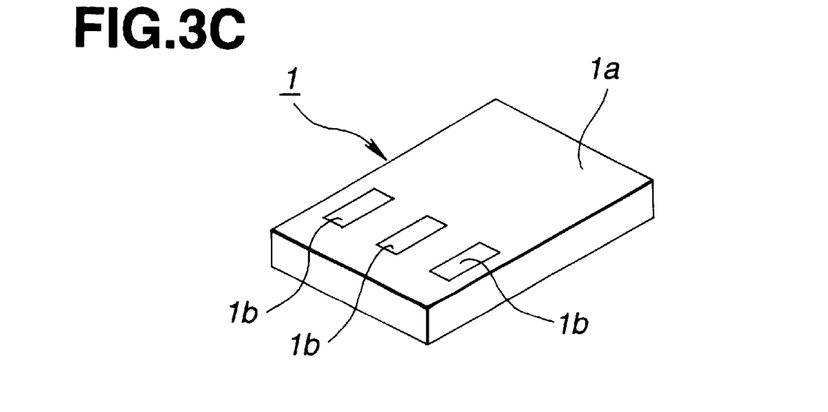
FIG. 3C is a perspective view illustrating a substrate to be connected to the resin top plate in the liquid-discharging recording head.

FIGS. 3A–3C illustrates a liquid-discharging recording head manufactured by applying a method for manufacturing a liquid-discharging recording head according to a first embodiment of the present invention. In FIG. 3, a top-plate main body 2a having a recess, serving as a common liquid chamber 2c of the liquid-discharging recording head, a recording-liquid receiving port 2e and a liquid-channel forming surface 2d, and a (top-plate) blank 2o (see FIG. 3A), which is a resin primary molding, having a discharging-port plate 2b for forming discharging ports 2g are integrally formed according to known injection molding or the like. A resin top plate 2 (see FIG. 3B), serving as a liquid-channel providing member, is manufactured by forming liquid channels 2f in the liquid-channel forming surface 2d of the top-plate blank 2o according to groove forming by projecting a laser beam, and by also forming discharging ports 2g communicating with corresponding ones of the liquid channels 2 in the discharging-port plate 2b according to hole forming by projecting a laser beam. The resin top plate 2 thus obtained is bonded to a substrate 1 (see FIG. 3C) having a plurality of electrothermal transducers 1b, serving as discharging-energy generating elements, on a surface 1a thereof in an aligned state.

Figure 4:
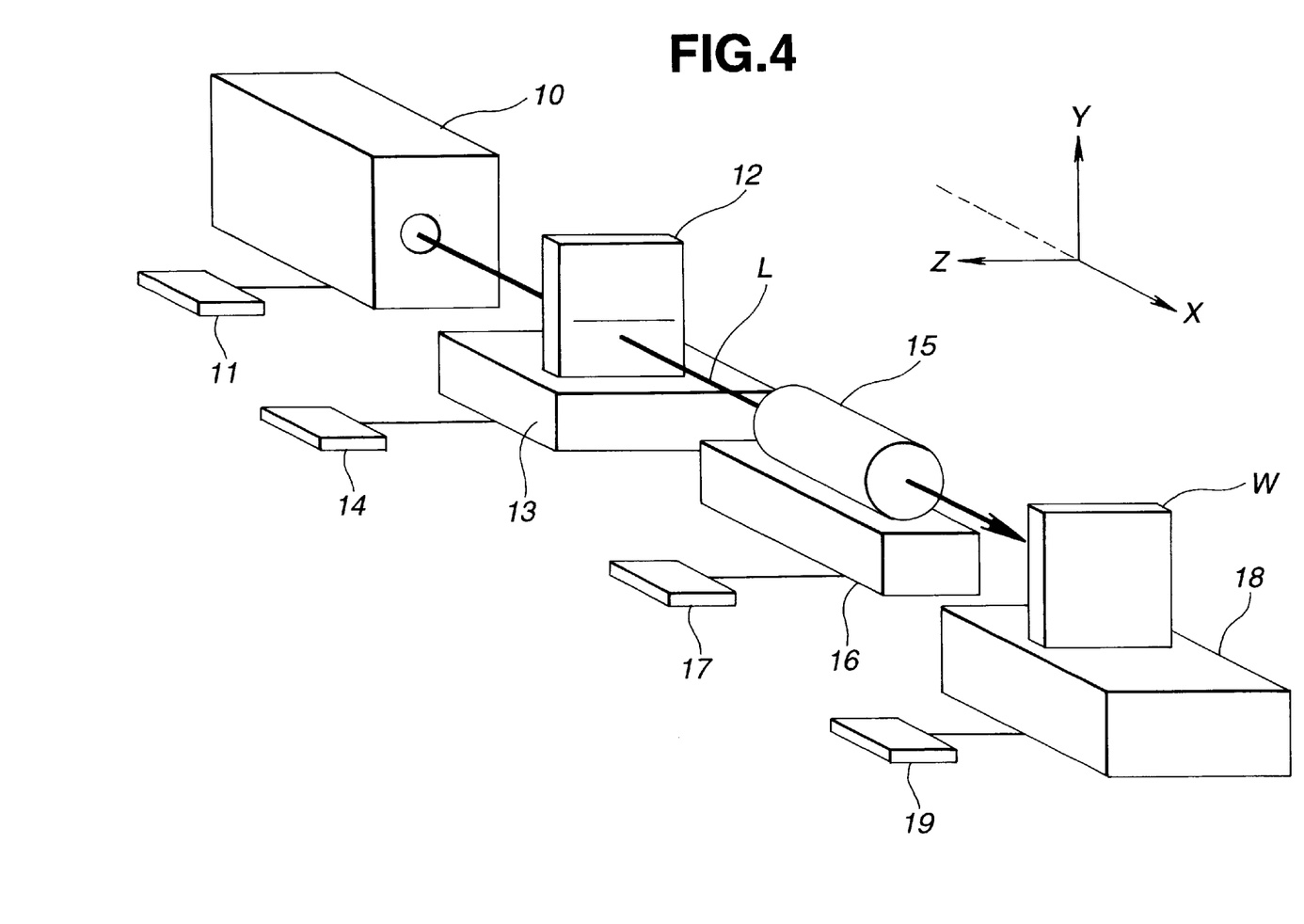
FIG. 4 is a schematic diagram illustrating the configuration of a laser processing apparatus applied to the liquid-discharging recording head of the first embodiment.

As shown in FIG. 4, a laser processing apparatus used for such groove forming and hole forming includes a laser oscillator 10 for generating a laser beam L, a controller 11 for changing the oscillation voltage or the oscillation frequency of the laser beam L emitted from the laser oscillator 10, a mask 12 having an aperture pattern for groove and/or hole forming, a movement driving device 13 for moving the mask 12 back and forth in the direction of the optical axis of the laser beam L, a controller 14 for controllng the movement driving device 13, a projection optical system 15 for projecting the aperture pattern of the mask 12 onto a substance to be processed W (the top-plate blank 2o), a rotation driving device 16 for rotating the projection optical system 15 around the optical axis of the laser beam L, and a controller 17 for controlling the rotation driving device 16. The substance to be processed W (the top-plate blank 2o) is positioned within a plane (the YZ plane) perpendicular to the optical axis (the X axis) of the laser beam L by a moving stage 18 controlled by a controller 19.

The mask 12 may have an aperture pattern for groove forming for forming the liquid channels, an aperture pattern for hole forming for forming the discharging ports, an aperture pattern for both groove forming for forming the liquid channels and hole forming for forming the discharging ports, or the like.

The motion driving device 13 for the mask 12 has a driving mechanism using a motor, such as a stepping motor, a servo motor or the like, and can move the mask 12 in the direction of the optical axis (the X axis) of the laser beam L, in the direction of arrangement of the aperture pattern (the Y axis) for groove and/or hole forming, or in the direction of rotation of the laser beam L around the optical axis, in units of a micrometer. The movement of the mask 12 can be selected from continuous movement at a constant speed and movement at a certain interval according to the situation.

The controllers 11, 14, 17 and 19 for controlling the laser oscillator 10 and the movement driving devices 13, 16 and 18, respectively, may be controlled together by a computer or the like.

In the above-described laser processing apparatus, the laser beam L passing through the mask 12 for groove forming or hole forming performs instantaneous ablation processing for the top-plate blank (hereinafter abbreviated as the "blank") 2o, serving as the substance to be processed W. At that time, in order to obtain grooves and holes having desired dimensions and pitches, provide large holes as the discharging ports, and shorten the processing time, it is necessary to project a laser beam having a high energy density per unit time. For example, when a laser beam having an energy density per unit time of $1J/cm^2$ and an oscillation frequency of 200 Hz is used, a hole having a large area is completely formed with irradiation of the laser beam for a few seconds.

When forming grooves or holes in the blank 2o by projecting a laser beam, since a laser beam having a high energy density per unit time is instantaneously projected onto the blank 2o, the resin is deformed due to thermal expansion, subsequent contraction and the like, thereby causing deviation in the dimensions and the pitch of the formed grooves or holes, and generation of burrs around the threaded holes. The processed blank 2o in which the resin is deformed and burrs and the like are produced has functional problems.

The present invention is characterized in that grooves or holes are formed by projecting a laser beam while changing the energy density per unit time of the projected laser beam. For example, a groove, serving as the liquid channel, or a hole, servning as the liquid discharging port, is formed by projecting a laser beam having a high energy density per unit time (for example, $1J/cm^2$) immediately before the groove or the hole is completely formed, and is then formed by reducing the energy density per unit time of the laser beam to a value so as not to deform the resin and generate burrs (for example, $500 mJ/cm^2$). By thus changing the energy density per unit time of the projected laser beam while performing processing, it is possible to solve the technical problems in the prior art that deviation in the dimensions and the pitch of the grooves or the holes occurs due to the deformation of the resin, and burrs are produced around the holes threaded by the laser beam, while maintaining the depth of the grooves and the size of the discharging ports to desired shapes without increasing the processing time.

The energy density per unit time of the projected laser beam may be changed continuously or stepwise.

By continuously changing the energy density per unit time of the laser beam L from a certain time while a groove, serving as the liquid channel, or a hole, serving as the discharging port, is formed in the blank 2o by the laser beam L, the shape of the groove or the hole changes in accordance with the change of the energy density per unit time. As a result, it is possible to solve the problems in the prior art that deviation in the dimensions and the pitch of the formed grooves or holes occurs, and burrs are produced around the holes threaded by the laser beam.

In the approach that the energy density per unit time of the laser beam L is changed stepwise from a certain time while a groove or a hole is formed in the blank 2o by the laser beam L, for example, first, processing is performed by projecting a laser beam having a high energy density per unit time, and then, the energy density per unit time of the projected laser beam is reduced stepwise. It is thereby possible to prevent deformation of the resin, and generation of burrs. In order to prevent deformation of the resin, it is desirable that the frequency of changing the energy density per unit time stepwise is large. On the other hand, in order to prevent generation of burrs around the hole, it is desirable that the frequency of changing the energy density stepwise is small so that the energy density per unit time is finely adjusted immediately before the hole is completely threaded.

When forming a hole serving as the discharging port, a laser beam having a high energy density per unit time is projected until a state in which the hole is to be completely formed by projecting a few pulses of the laser beam is provided. Then, the processing is performed by a few pulses of a laser beam having a low energy density per unit time immediately before the processing is to be completed. That is, when forming a hole serving as the discharging port by projecting, for example, 800 pulses of a laser beam, first, the processing is performed by 795 pulses of a laser beam having a high energy density per unit time of $1-2$ $J/cm^2$. Then, the processing is performed by 5 pulses of a laser beam having a low energy density of about $500$ $mJ/cm^2$. It is thereby possible to prevent generation of burrs around the threaded hole.

The energy density per unit time of the laser beam can be changed using an energy changing apparatus (not shown). In a method for dividing the energy density per unit time of the laser beam stepwise, each time (timing) for changing the energy density per unit time is set in advance in terms of the number of pulses, and the number of pulses of the projected laser beam is accumulated. When the accumulated number of pulses has reached the set number of pulses, the energy density per unit time is changed. In another approach, a timer mechanism is provided in an energy changing apparatus (not show). When the irradition time has reached a predeterimined time, the energy density per unit time of the projected laser beam is changed assuming that a specified number of pulses of the laser beam have been projected, and a specified number of pulses of the laser beam are again projected. Thus, the number of pulses is controlled by counting the time.

According to the above-described approaches, in the process of forming a groove, serving as the liquid channel, or a hole, serving as the discharging port, by projecting hundreds to thousands of pulses of a laser beam, by adjusting and changing the energy density per unit time of the laser beam stepwise, it is possible to suppress deformation of the resin, and to prevent deviation in the dimensions and the pitch of the groove or the hole. When forming a groove, serving as the liquid channel, and a hole, serving as the discharging port, by projecting a laser beam, by performing the processing by first projecting a laser beam having a high energy density per unit time, and then reducing the energy density per unit time of the laser beam for a few pulses of the laser beam immediately before completion of the processing, the shape of the groove or the hole is the same as when performing the processing by a laser beam having a high energy density per unit time for all pulses, and nevertheless generation of burrs around the groove or the hole can be prevented.

The energy density per unit time of the projected laser beam is changed, for example, by adjusting the applied voltage of the laser oscillator, adjusting the frequency of the laser oscillator, simultaneously adjusting the applied voltage and the oscillation frequency of the laser oscillator, attenuating the laser beam using a member, such as a beam attenuating filter or the like, or moving the blank serving as the substance to be processed. Each of the above-described approaches will now be further described.

The energy density per unit time of the projected laser beam can be changed by adjusting the voltage applied to the laser gas of the laser oscillator. The energy density per unit time of the laser beam L projected onto the blank $2o$ is adjusted by adjusting the applied voltage of the laser oscillator while a groove, serving as the liquid channel, or a hole, serving as the discharging port, is formed by projecting the laser beam L.

The applied voltage of the laser oscillator 10 is adjusted by adjusting the oscillation voltage of the laser oscillator 10 so as to provide a desired irradiation energy density per unit time by controlling the laser oscillator 10 by the controller 11 of the laser oscillator 10. The energy density per unit time of the laser beam L can be changed continuously or stepwise by adjusting the applied voltage of the laser oscillator 10 continuously or stepwise, respectively.

By adjusting the energy density per unit time of the laser while a groove or a hole is formed, by adjusting the applied voltage of the laser oscillator stepwise, deformation of the resin can be suppressed. By adjusting the applied voltage so that the processing is performed by projecting a laser beam having a high energy density per unit time immediately before the hole is completely formed, and the processing is performed by a laser beam having a low energy density per unit time for a few pulses immediately before the hole is completely formed, it is possible to prevent generation of burrs around the holes.

The energy density per unit time of the projected laser beam can be changed by changing the oscillation frequency of the laser beam. By changing the oscillation frequency of the laser beam L while a groove, serving as the liquid channel, or a hole, serving as the discharging port, is formed by projecting the laser beam L, the energy density per unit time of the projected laser beam L can be changed.

The oscillation frequency is generally represented by Hz (Herz), which indicates the number of pulses of the laser beam per second projected onto the blank. That is, when the processing is performed at a high frequency, the number of pulses of the laser beam projected onto the blank per unit time is large, so that the energy density per unit time of the projected laser beam is high. On the other hand, when the processing is performed at a low frequency, the energy density per unit time of the projected laser beam is low.

The frequency of the laser oscillator 10 is adjusted so as to provide a desired energy density per unit time by controlling the laser oscillator 10 by the controller 11 of the laser oscillator 10. The energy density per unit time can be changed continuously or stepwise by adjusting the oscillation frequency of the laser oscillator continuously or stepwise, respectively.

As described above, when forming a groove, serving as the liquid channel, or a hole, serving as the discharging port, by changing the energy density per unit time of the projected laser beam continuously or stepwise by changing the oscillation frequency of the laser beam continuously or stepwise, respectively, it is possible to prevent deviation in the dimensions and the pitch of the groove or the hole. When forming a hole serving as the discharging port, by performing the processing by a laser beam having a high energy density per unit time by using a high frequency immediately before the hole is completely formed, and then performing the processing by a laser beam having a low energy density per unit time by reducing the oscillation frequency for few pulses immediately before the hole is completely formed, it is possible to prevent generation of burrs.

By simultaneously changing the oscillation voltage and the oscillation frequency of the laser beam L while a groove, serving as the liquid channel, or a hole, serving as the discharging port, is formed by projecting the laser beam L, the energy density per unit time of the laser beam L projected onto the blank $2o$ can be changed.

The oscillation voltage and the oscillation frequency of the laser beam L are simultaneously adjusted so as to provide a desired irradiation energy density per unit time by controlling the laser oscillator 10 by the controller 11. The respective parameters are changed by the controller 11 continuously or stepwise as described above.

When forming a groove or a hole, by changing the energy density per unit time of the projected laser beam continuously or stepwise, it is possible to prevent deviation in the dimensions and the pitch of the formed groove or hole. When forming a hole, by performing the processing by projecting a laser beam having a high energy density per unit time immediately before the hole is completely formed, and then performing the processing by projecting a laser beam having a low energy density per unit time for a few pulses immediately before the hole is completely formed, it is possible to prevent generation of burrs around the hole.

The energy density per unit time of the projected laser beam can also be changed by attenuating the laser beam using a compoment other than a laser mask. By reducing the intensity of the laser beam L by a component other than a laser mask while a groove, serving as the liquid channel, or a hole, serving as the discharging port, is formed by projecting the laser beam L, the energy density per unit time of the laser beam L projected onto the blank $2o$ is changed.

As means for attenumating a laser beam, a mechanism for inserting a beam attenuating filter or the like in the optical axis of the laser beam is provided. When performing the processing by a laser beam having a high energy density per unit time, the beam attenuating filter is removed from the optical axis. When performing the processing by reducing the energy density per unit time of the laser beam, the beam attenuating filter is inserted in the optical axis by instantaneously operating the mechanism, in order to reduce the energy density per unit time of the laser beam. A mechanical driving device, such as an air cylinder or the like, or an electric driving stage using a pulse driving motor, a servo motor or the like can be used as the mechanism for inserting the beam attenuating filter in the optical axis. The mechanism for inserting the beam attenuating filter can be controlled by a controller. As for the time (timing) for changing the energy density per unit time of the laser beam, i.e., the time of insertion of the beam attenuating filter, the energy density per unit time of the projected laser beam can be reduced by setting in advance a predetermined number of pulses, accumulating the number of pulses of the projected laser beam, and operating the mechanism for inserting the beam attenuating filter as soon as the accumulated number of pulses has reached the predetermined number. In another approach, a timer mechanism is provided in a controller. When the irradiation time has reached a predetermined time, the mechanism for inserting the beam attenuating filter is operated so as to reduce the energy density per unit time of the projected laser beam, assuming that a specified number of pulses of the laser beam have been projected.

Any component other than the beam attenuating filter may also be used, provided that the intensity of the laser beam can be reduced and the characteristics of the entire optical system are not degraded when the beam attenuating filter is inserted. The energy density per unit time of the projected laser beam may be changed stepwise by providing a plurality of beam attenuating mechanisms in the optical axis.

When forming a groove or a hole, by changing the energy density per unit time of the projected laser beam stepwise, it is possible to suppress deformation of resin, and prevent deviation in the dimensions and the pitch of the formed groove or hole. When forming a hole, by performing the processing by projecting a laser beam having a high energy density per unit time immediately before the hole is completely formed, and then performing the processing by projecting a laser beam having a low energy density per unit time for a few pulses immediately before the hole is completely formed, it is possible to prevent generation of burrs around the hole.

By moving the blank 2o, serving as the substance to be processed, while a groove, serving as the liquid channel, or a hole, serving as the discharging port, is formed by projecting the laser beam L, it is possible to change the energy density per unit time of the laser beam L projected onto the blank 2o.

The blank serving as the substance to be processed is usually processed by projecting the laser beam in a state of being placed at the position of the focus of the laser optical system. At that time, the focus position of the laser optical system is in a state in which the energy density per unit time is high, because the energy of the laser beam in concentrated at that position. Accordingly, if the blank is shifted back or forth from the focus position in the optical axis of the laser beam, the energy density per unit time of the laser projected onto the blank decreases because the laser beam is not concentrated.

The blank 2o is moved in parallel in the optical axis using the electrically driven moving stage 18 including a driving device, such as a pulse motor, a servo motor or the like. When performing the processing by projecting a laser beam having a high energy density per unit time, the processing is performed by placing the blank 2o at the focus position of the optical system in the optical axis. When performing the processing by reducing the energy density per unit time of the laser beam, the blank 2o is moved in the optical axis by operating the stage driving mechanism in order to reduce the energy density per unit time of the projected laser beam.

In the above-described approach of moving the blank, the energy density per unit time of the laser beam projected onto the blank may be changed continuously or stepwise by moving the blank continuously or stepwise, respectively.

The above-described stage driving mechanism can be controlled by the controller 19. The number of projected pulses of the laser beam is accumulated, and the position of the blank is changed so as to reduce the energy density per unit time of the laser beam when the accumulated number of pulses has reached a set number of pulses. In another approach, a timer mechanism is provided in the controller 19. When the irradiation time has reached a predetermined time, the position of the blank is moved so as to reduce the energy density per unit time of the projected laser beam, assuming that a specified number of pulses of the laser beam have been projected.

When forming a groove or a hole, by adjusting the energy density per unit time of the projected laser beam continuously or stepwise by moving the blank in the optical axis of the laser beam continuously or stepwise, respectively, it is possible to suppress deformation of resin, and prevent deviation in the dimensions and the pitch of the formed groove or hole. When forming a hole, by performing the processing by projecting a laser beam having a high energy density per unit time immediately before the hole is completely formed, and then performing the processing by projecting a laser beam having a low energy density per unit time for a few pulses immediately before the hole is completely formed, it is possible to prevent generation of burrs around the hole.

As described above, by adjusting the energy density per unit time of a laser beam projected onto a blank serving as a substrate to be processed and performing processing by changing the energy density per unit time of the laser beam continuously or stepwise, by adjusting the applied voltage of a laser oscillator, adjusting the frequency of the laser oscillator, simultaneously adjusting the applied voltage and the oscillation frequency of the laser oscillator, reducing the intensity of the laser beam using a member, such as a beam attenuating filter or the like, or moving the blank serving as the substance to be processed, it is possible to prevent a change in the shape of the processed portion which is inevitable as a result of an abrupt change in the energy density per unit time of the laser beam, prevent deviation in the dimensions and the pitch of the processed groove or hole, prevent generation of burrs around the threaded hole, and to accurately form a groove (the liquid channel) having a desired depth and a hole (the discharging port) having a desired size. According to the manufacturing method of the present invention, since the liquid channel and the discharging port can be formed in a short time, it is possible to reduce the cost of the processing.

In the liquid-discharging recording head manufactured by changing the energy density per unit time of the projected laser beam while a groove, serving as the liquid channel, or a hole, serving as the discharging port, is formed by projecting the laser beam onto the top-plate blank, deviation in the dimensions and the pitch of the formed groove or hole, and generation of burrs around the threaded discharging port are prevented. Hence, it is possible to form large discharging ports with a low cost, and to prevent misalignment between the liquid channels and the discharging ports, and electrothermal transducers. The liquid-discharging recording head thus manufactured has excellent printing characteristics.

Figure 5A:
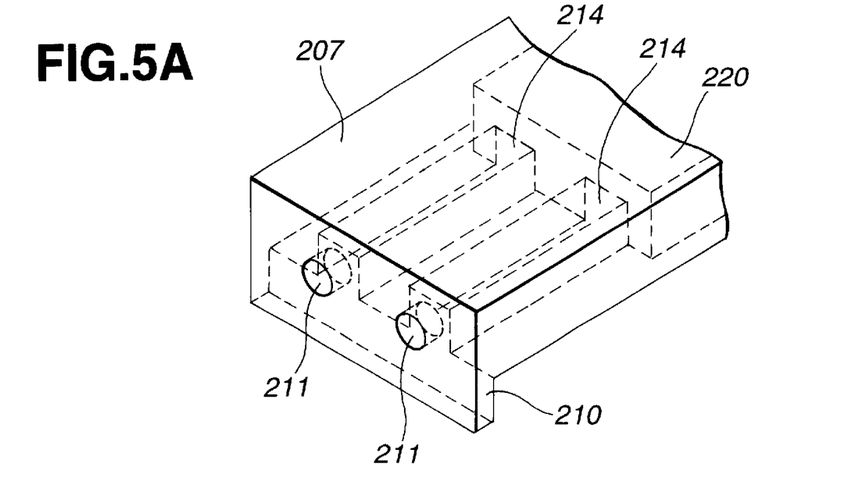
FIG. 5A is a perspective view illustrating a resin top plate in which liquid channels and discharging ports are formed.

FIG. 5A is a schematic perspective view illustrating a top plate 207 according to a second embodiment of the present invention. The top plate 207 includes a desired number (two in FIG. 5A in order to simplify the description) of ink-channel grooves 214, and ink discharging ports (orifices) 211 formed on an orifice plate 210, which is provided in a state of being integrated with the top plate 207, so as to correspond to the ink-channel grooves 214. In the case shown in FIG. 5A, the top plate 207 is made of a polysulfone resin which has an excellent ink-resisting property, and is integrally formed with the orifice plate 210 within a metallic mold. A resin other than polysulfone, such as polyether sulfone, polyphenylene oxide, polypropylene or the like, may be used as the material for the top plate 207.

Next, a description will be provided of a method for forming the ink-liquid grooves 214 and the orifices 211. The liquid-channel grooves 214 may be formed in the top plate 207 by molding a resin in a mold which is formed by providing fine grooves having a pattern reverse to the pattern of the grooves 214 according to cutting or the like. Thus, the liquid-channel grooves 214 can formed in the top plate 207.

The orifices 211 are formed by molding the orifice plate 210 not having the orifices 211 in a metallic mold, and then, as shown in FIG. 4, projecting an eximer laser beam from a laser device from the ink liquid channel side of the orifice plate 210 onto positions where the orifices 211 are to be formed and thereby removing the resin by evaprating it.

Figure 5B:
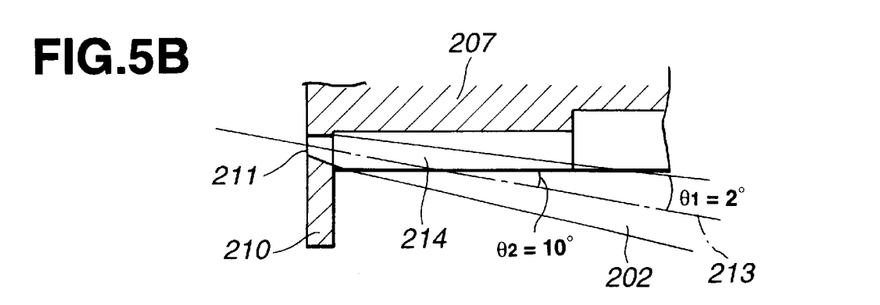
FIG. 5B is a side cross-sectional view of the top plate illustrating a manner of forming a discharging port by a laser beam.

FIG. 5B is a side cross-sectional view illustrating a state in which the orifice 211 is formed. As is apparent from FIG. 5B, an excimer laser beam 202 is projected onto the orifice plate 210 from the ink liquid channel 214 side via the mask 12. The excimer laser beam 202 is condensed within an angle $\theta_1=2$ degrees at one side with respect to an optical axis 213, which is inclined by $\theta_2=10$ degrees with respect to a direction perpendicular to the plane of the orifice plate 210. By thus projecting the laser beam 202 from the ink liquid channel 214 side, the cross section of the orifice 211 has a tapered shape of decreasing in the ink discharging direction.

The eximer laser used in the second embodiment will now be described. The excimer laser can emit ultraviolet light, and has features such that, for example, it has high intensity, excellent monochromaticity, and directivity, and that it can perform short-pulse oscillation and can have very high energy density by being condensed by a lens. An excimer laser oscillator can generate short-pulse (15–35 ns) ultraviolet light by causing discharge excitation of a mixed gas of a rare gas and halogen. A Kr—F, Xe—Cl or Ar—F laser is frequently used as the excimer laser. When high-intensity short-pulse ultraviolet light, such as the eximer laser beam, is projected onto the surface of a polymer resin, ablative photodecomposition (APD) process, in which the irradiated portion is instantaneously decomposed and dispersed with a plasma emission and impulsive sound, occurs. The polymer resin can be processed in this process.

In the second embodiment, 245 pulses of a pulsed laser beam having an energy density of 1 J/cm$^2$ and a pulse width of 20 nsec were projected in order to perform processing for a thickness of 49 μm immediately before each hole, serving as the discharging port, is completely formed. Then, 10 pulses of a laser beam having an energy density of 500 mJ/cm$^2$ and a pulse width of 20 nsec were projected in order to perform processing for a thickness of 1 μm. As a result, 300 exactly circular discharging ports (a diameter of 20 μm, and a thickness of 50 μm) having no burrs therearound could be formed.

Figure 5C:
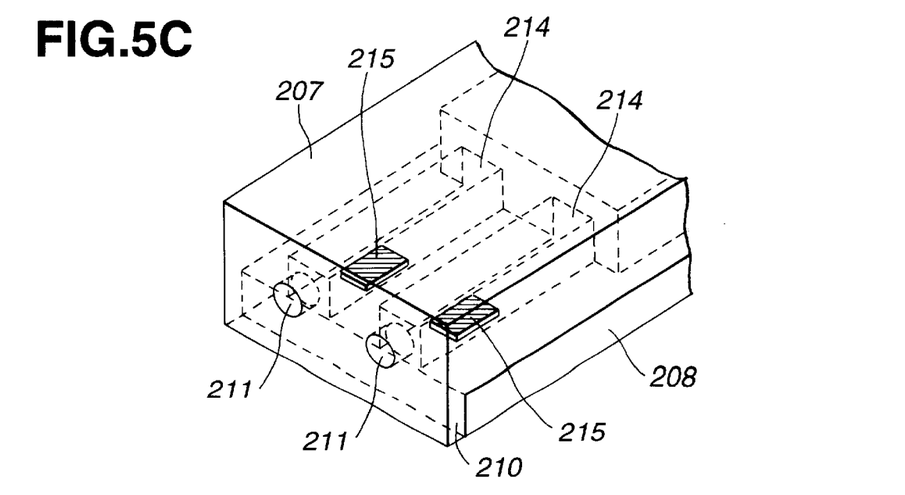
FIG. 5C is a perspective view illustrating the liquid-discharging recording head in which a substrate is connected to the resin top plate.

FIG. 5C is a schematic perspective view illustrating a recording-head main body obtained by connecting together a heater board 208 and the above-described top plate 207. As shown in FIG. 5C, an ink-jet recording head is obtained by connecting the heater board 208, including discharging heaters 215 and the like, to the orifice plate 210. That is, the ink-jet recording head is obtained by connecting together the top plate 207 including recesses (hereinafter also called "grooves") for providing the ink liquid channels 214 and a common liquid chamber 220, formed integrally with the orifice plate 210, and the substrate (hereinafter also called the "heater board") 208 obtained by forming electrothermal tranducers (hereinafter also called "discharging heaters") 215 for generating energy utilized for discharging ink from corresponding ones of the discharging ports 211, and an Al interconnection on a Si substrate according to a film forming technique.

Figure 6:
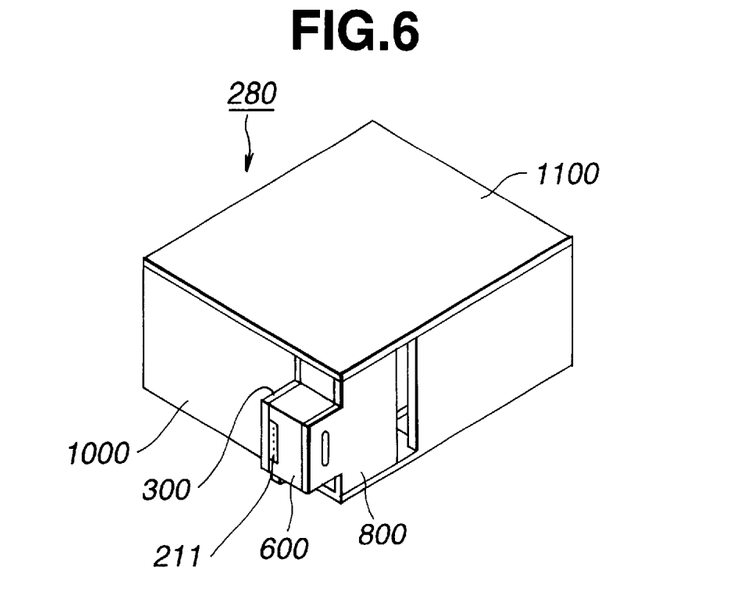
FIG. 6 is a schematic perspective view illustrating a head cartridge having a liquid-discharging recording head according to a third embodiment of the present invention.

FIG. 6 is a perspective view illustrating an ink-jet head cartridge according to a third embodiment of the present invention. The ink-jet head cartridge is disposable and is obtained by intergrating an ink-jet recording head 280 with an ink tank. In FIG. 6, a sub-ink tank 600 is disposed adjacent to the main body of the recording head. The sub-ink tank 600 and the main body are supported by lids 300 and 800. Reference numeral 1000 represents a cartridge main body, and reference numeral 1100 represents a cover member for the cartridge main body 1000. The ink tank is incorporated within the cartridge main body 1000, and appropriately supplies the sub-ink tank with ink.

Figure 7:
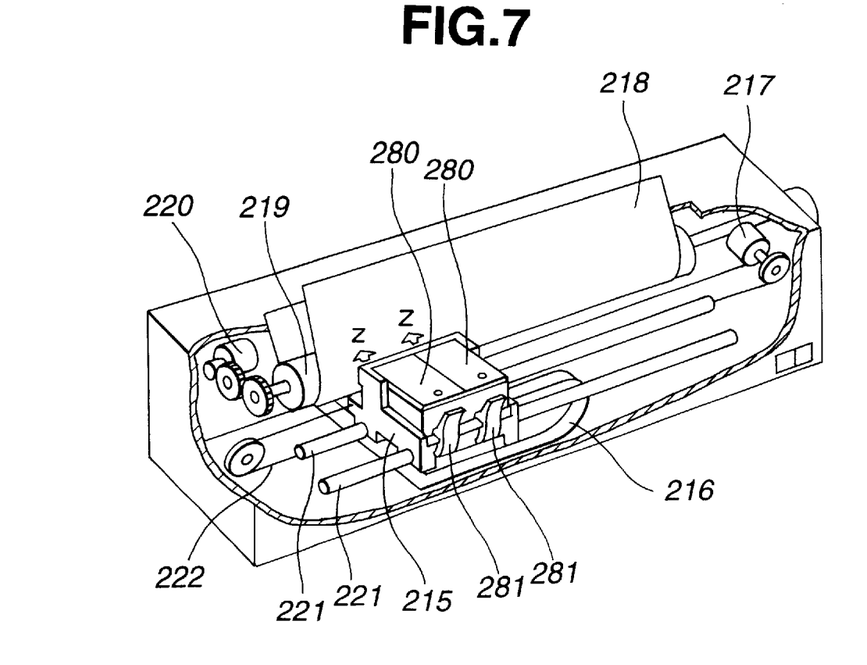
FIG. 7 is a schematic perspective view illustrating a principal portion of a liquid-discharging recording apparatus in which the liquid-discharging recording head shown in FIG. 6 is mounted.

In FIG. 7, there is shown the ink-jet head cartridge 280 shown in FIG. 6. The ink-jet head cartridge 280 is fixed on a carriage 251 by pressing members 281, and is reciprocatable in the longitudinal direction along a shaft 221. The ink-jet head cartridge 280 may be positioned, for example, using a hole provided in the lid 300, and a dowel or the like provided at the carriage 215 side. Electric connection may be provided by connecting a connector on the carriage 251 to a connection pad provided on an interconnection substrate.

Ink droplets discharged from the orifices 211 of the recording head reach a recording medium 218 whose recording surface is regulated by a platen 219 so as to provide a fine space with the recording head, to form an image on the recording medium 218. A discharging signal corresponding to image data is supplied to the recording head from an appropriate data supply source via a cable 216 and a terminal connected thereto. One or a plurality (two in FIG. 7) of ink-jet head cartridges 280 may be provided in accordance with ink colors to be used.

In FIG. 7, a carriage motor 217 causes the carriage 251 to perform scanning along the shaft 221. A wire 222 transmits the driving force of the motor 217 to the carriage 251. A feed motor 220 conveys the recording medium 218 by being connected to a platen roller 219.

Particularly, the present invention has excellent effects in a recording head or a recording apparatus according to an ink-jet recording method in which recording is performed by forming flying droplets utilizing thermal energy, from among liquid-discharging recording methods.

Typical configurations and principles of the ink-jet recording method are disclosed, for example, in U.S. Pat. Nos. 4,723,129 and 4,740,796. It is preferable that the present invention uses such basic principles. This recording method can be applied to both of so-called on-demand type and continuous type.

This recording method will now be briefly described. By supplying a discharging signal, i.e., applying at least one driving signal for causing a rapid temperature rise exceeding a nucleate boiling phenomenon and for generating the nucleate boiling phenomenon to an electrothermal transducer, serving as a discharging-energy generating element, disposed so as to face a sheet holding a recording liquid (ink), or a liquid channel in accordance with recording information, thermal energy is generated to cause film boiling on the heat operating surface of the recording head and to form a bubble within the liquid (ink) corresponding to the driving signal. Hence, this method is particularly effective for the on-demand type. By discharging the liquid (ink) from the discharging port due to the growth and contraction of the bubble, at least one droplet is formed. It is preferable to provide the driving signal in the form of a pulse because the bubble can be instantaneously and appropriately grown and contracted and the discharging of the liquid (ink) with a high response speed can be achieved. A pulse-shaped driving signal such as ones described in U.S. Pat. Nos. 4,463,359 and 4,345,262 is suitable. By adopting conditions described in U.S. Pat. No. 4,313,124 relating to the rate of temperature rise of the heat operating surface, more excellent recording can be performed.

In addition to the configuration of combining discharging ports, a liquid channel and electrothermal transducers (a linear liquid channel or an orthogonal liquid channel) as disclosed in the above-described patent applications, configurations described in U.S. Pat. Nos. 4,558,333 and 4,459,600 is which a heat operating unit is disposed at a bending region may also be adopted for the recording head of the present invention.

In addition, the present invention is also effective for a configuration disclosed in Japanese Patent Laid-Open Application (Kokai) No. 59-123670 (1984) in which a common slit is used as a discharging port for a plurality of electrothermal transducers, and to a configuration disclosed in Japanese Patent Laid-Open Application (Kokai) No. 59-138461 (1984) in which an aperture for absorbing the pressure wave of thermal energy is used as a discharging port.

The present invention is also effectively used for a full-line-type recording head having a length corresponding to the maximum width of a recording medium which can be recorded by the recording apparatus. Such a recording head may have a configuration of covering the length by a combination of a plurality of recording heads, or may be a single integrally formed recording head.

Furthermore, the present invention is also effective for an exchangeable chip-type recording head capable of electric connection to the main body of the apparatus and ink supply from the main body of the apparatus by being mounted on the main body of the apparatus, and a cartridge-type recording head having an ink tank provided as one body therewith.

The addition of recovering means and preliminary means to the recording head is preferable because the recording apparatus can be more stabilized. More specifically, these means include capping means, cleaning means, and pressing or suctioning means for the recording head, preliminary heating means for performing heating using an electrothermal transducer, a heating element other than the electrothermal transducer, or a combination of these elements, and preliminary discharging means for performing discharging other than recording.

Furthermore, the present invention is very effective for a recording mode using a single color, such as black or the like, an integrally formed recording head, a combination of a plurality of recording heads, and a recording apparatus which has at least one of a recording mode using a plurality of different colors and a recording mode of obtaining a full-color image by mixing colors.

Although in the foregoing embodiments, a description has been provided illustrating ink in the form of a liquid, ink which is solidified at a temperature equal to or lower than the room temperature and is softened or liquidized at the room temperature, or ink which is softened or liquidized within a temperature range of 30° C.–70° C. for temperature control generally performed in the ink-jet method may also be used. That is, ink which is liquidized when providing a recording signal may be used. Furthermore, in order to prevent temperature rise due to thermal energy by using the energy for liquidizing ink from a solidified state or to prevent evaporation of ink, ink which is usually solid and is liquidized by being heated may also be used. Anyway, the present invention can also be applied to a case in which ink is liquidized by providing thermal energy corresponding to a recording signal and the liquidized ink is discharged, and to a case of using ink which is liquidized by providing thermal energy and starts to be solidified when it reaches a recording medium. As disclosed in Japanese Patents Laid-Open Application (Kokai) Nos. 54-56847 (1979) and 60-71260 (1985), such ink may be provided so as to face an electrothermal transducer while being held in recesses or threaded holes of a porous sheet in a liquid or solid state. In the present invention, the above-described film boiling method is most effective for the above-described ink.

The ink-jet recording apparatus may be used for an image output terminal of an information processing apparatus, such as a computer or the like, a copier combined with a reader and the like, or a facsimile apparatus having a transmission/reception function.

The individual components shown in outline in the drawings are all well known in the liquid-discharging recording arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for manufacturing a liquid-discharging recording head by projecting laser energy, via a laser beam having an energy density per unit time, onto a subject to be processed, to form holes serving as discharging ports for discharging a liquid, said method comprising:

a first processing step of processing the subject by projecting onto the subject the laser beam with a predetermined value for the energy density per unit time; followed by a second processing step of processing the subject by projecting onto the subject the laser beam with a value for the energy density per unit time smaller than the predetermined value, to complete formation of the holes, wherein at least the last projection of the laser beam used in said method to form the holes serving as the discharging ports has the lowest value for the energy density per unit time among values for the energy density per unit time used in said method.

2. The method according to claim 1, wherein the subject is processed by continuously changing the energy density per unit time of the laser beam projected onto the subject.

3. The method according to claim 1, wherein the subject is processed by changing the energy density per unit time of the laser beam projected onto the subject in a stepwise fashion.

4. The method according to claim 1, wherein the energy density per unit time of the laser beam projected onto the subject is changed by adjusting an oscillation frequency of the laser beam.

5. The method according to claim 1, wherein each of the discharging ports has an inside and an outside and the laser energy is projected from the inside to the outside of each of the discharging ports.

6. The method according to claim 1, wherein grooves serving as liquid channels communicating with corresponding ones of the discharging ports are formed by laser energy projected onto the subject.

7. The method according to claim 1, wherein the laser energy projected onto the subject comprises pulsed laser energy.

8. The method according to claim 7, wherein the energy density per unit time of the laser beam for a few pulses immediately before the discharging ports are completely formed is made smaller than a former value among the values for the energy density per unit time used in said method.

9. The method according to claim 1, wherein grooves serving as liquid channels communicating with corresponding ones of the discharging ports are formed by laser energy projected onto the subject.

10. A method for manufacturing a liquid-discharging recording head by projecting laser energy, via a laser beam having an energy density per unit time, onto a subject to be processed, to form holes serving as discharging ports for discharging a liquid, said method comprising the following steps for forming a hole:
   a first processing step of processing the subject by projecting onto the subject the laser beam with a predetermined value for the energy density per unit time; followed by
   a second processing step of processing the subject by projecting onto the subject the laser beam with a value for the energy density per unit time smaller than the predetermined value, to complete formation of the hole, wherein at least the last projection of the laser beam used to form a hole serving as a discharging port has the lowest value for the energy density per unit time among values for the energy density per unit time used in said method.

11. The method according to claim 10, wherein the subject is processed by continuously changing the energy density per unit time of the laser beam projected onto the subject.

12. The method according to claim 10, wherein the subject is processed by changing the energy density per unit time of the laser beam projected onto the subject in a stepwise fashion.

13. The method according to claim 10, wherein the energy density per unit time of the laser beam projected onto the subject is changed by adjusting an oscillation frequency of the laser beam.

14. The method according to claim 10, wherein each of the discharging ports has an inside and an outside and the laser energy is projected from the inside to the outside of each of the discharging ports.

15. The method according to claim 10, wherein the laser energy projected onto the subject comprises pulsed laser energy.

16. The method according to claim 15, wherein the energy density per unit time of the laser beam for a few pulses immediately before each of the discharging ports is completely formed is made smaller than a former value among the values for the energy density per unit time used in said method.

* * * * *